(12) United States Patent
Zheng

(10) Patent No.: US 9,129,548 B2
(45) Date of Patent: Sep. 8, 2015

(54) AMBIENT LIGHT SENSORS WITH INFRARED COMPENSATION

(71) Applicant: Apple Inc., Cupertino, CA (US)

(72) Inventor: Dong Zheng, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 13/678,349

(22) Filed: Nov. 15, 2012

(65) Prior Publication Data

US 2014/0132578 A1   May 15, 2014

(51) Int. Cl.
G06F 3/038 (2013.01)
G09G 3/36 (2006.01)
G09G 5/10 (2006.01)
G01J 3/51 (2006.01)
G01J 1/42 (2006.01)

(52) U.S. Cl.
CPC .............. G09G 5/10 (2013.01); G01J 1/4204 (2013.01); G01J 1/4228 (2013.01); G01J 3/513 (2013.01); *G01J 2001/4242* (2013.01); *G02F 2201/58* (2013.01); *G09G 2320/0626* (2013.01); *G09G 2360/144* (2013.01)

(58) Field of Classification Search
CPC .............. G09G 5/10; G09G 2360/144; G09G 2320/0626; G01J 3/513; G01J 1/4228; G01J 1/4204; G01J 2001/4242; G02F 2201/58
USPC .......................................... 345/102, 207, 690
See application file for complete search history.

(56) References Cited

U.S. PATENT DOCUMENTS 6,339,429 B1   1/2002 Schug
6,459,436 B1   10/2002 Kumada
6,801,836 B2   10/2004 Schanin
7,153,720 B2   12/2006 Augusto
7,391,172 B2   6/2008 Ferguson et al.
(Continued)

FOREIGN PATENT DOCUMENTS

EP      1335430     8/2003
WO      00/41378    7/2000
(Continued)

OTHER PUBLICATIONS

Zheng et al., U.S. Appl. No. 13/241,034, filed Sep. 22, 2011.
(Continued)

*Primary Examiner* — Rodney Amadiz
(74) *Attorney, Agent, or Firm* — Treyz Law Group; Jason Tsai

(57) ABSTRACT

An electronic device may have a display with a brightness that is adjusted based on ambient light data from one or more ambient light sensors. An ambient light sensor may include at least one silicon-based photosensor. The silicon-based photosensor may generate a corresponding raw sensor reading. Processing circuitry associated with the ambient light sensor may analyze the raw sensor reading to determine the type of light source that is present by comparing measurements from at least two different photosensors, by determining the color temperature of the light source, and/or by determining the modulation frequency of the light source. A compensation factor may then be selected by referring to a lookup table. The processing circuitry may compute a compensated sensor reading based on the raw sensor reading and the selected compensation factor. The brightness of the display may be adjusted based on the compensated sensor reading computed in this way.

16 Claims, 13 Drawing Sheets

(56) References Cited

U.S. PATENT DOCUMENTS

| | | | |
|---|---|---|---|
| 7,453,057 B2 * | 11/2008 | Drummond et al. | 250/214 AL |
| 7,460,196 B2 | 12/2008 | Kim | |
| 7,586,479 B2 | 9/2009 | Park et al. | |
| 7,825,891 B2 | 11/2010 | Yao et al. | |
| 7,957,762 B2 | 6/2011 | Herz et al. | |
| 7,960,682 B2 | 6/2011 | Gardner, Jr. | |
| 8,031,164 B2 | 10/2011 | Herz et al. | |
| 8,194,031 B2 | 6/2012 | Yao et al. | |
| 8,223,117 B2 | 7/2012 | Ferguson | |
| 8,274,051 B1 * | 9/2012 | Aswell et al. | 250/339.05 |
| 8,304,711 B2 | 11/2012 | Drummond et al. | |
| 8,384,003 B2 | 2/2013 | Gardner, Jr. | |
| 2003/0189211 A1 | 10/2003 | Dietz | |
| 2003/0189586 A1 | 10/2003 | Vronay | |
| 2004/0032676 A1 * | 2/2004 | Drummond et al. | 359/877 |
| 2004/0036820 A1 | 2/2004 | Runolinna | |
| 2004/0095402 A1 | 5/2004 | Nakano | |
| 2005/0219197 A1 | 10/2005 | Pasqualini et al. | |
| 2007/0236485 A1 | 10/2007 | Trepte | |
| 2007/0268241 A1 | 11/2007 | Nitta et al. | |
| 2008/0055297 A1 * | 3/2008 | Park | 345/205 |
| 2008/0284716 A1 | 11/2008 | Edwards | |
| 2009/0237423 A1 * | 9/2009 | Shih et al. | 345/690 |
| 2010/0079426 A1 | 4/2010 | Pance et al. | |
| 2010/0090996 A1 | 4/2010 | Chou et al. | |
| 2011/0043503 A1 * | 2/2011 | Hadwen | 345/207 |
| 2011/0199349 A1 | 8/2011 | Katoh | |
| 2011/0234302 A1 | 9/2011 | Utsunomiya et al. | |
| 2011/0248170 A1 * | 10/2011 | Holcombe et al. | 250/340 |
| 2011/0273377 A1 | 11/2011 | Merz | |
| 2012/0001841 A1 * | 1/2012 | Gokingco et al. | 345/102 |
| 2012/0056091 A1 | 3/2012 | Mahowald | |
| 2012/0170284 A1 | 7/2012 | Shedletsky | |
| 2012/0188483 A1 * | 7/2012 | Matsuzaki et al. | 349/62 |
| 2012/0218239 A1 | 8/2012 | Yao et al. | |

FOREIGN PATENT DOCUMENTS

| | | |
|---|---|---|
| WO | 02/37454 | 5/2002 |
| WO | 2007/069107 | 6/2007 |

OTHER PUBLICATIONS

Chiang et al., "Integrated Ambient Light Sensor With Nanocrystalline Silicon on a Low-Temperature Polysilicon Display Panel", IEEE Transactions on Electron Devices, vol. 56, No. 4, pp. 578-586, Apr. 2009.

Wuu et al., "A Leading-Edge 0.9 µm Pixel CMOS Image Sensor Technology with Backside Illumination: Future Challenges for Pixel Scaling (Invited)", Taiwan Semiconductor Manufacturing Company, 2009.

Hotelling et al., U.S. Appl. No. 13/283,446, filed Oct. 27, 2011.

Shedletsky et al., U.S. Appl. No. 13/732,966, filed Jan. 2, 2013.

Jong et al., U.S. Appl. No. 13/686,746, filed Nov. 27, 2012.

Land et al., U.S. Appl. No. 13/746,549, filed Jan. 22, 2012.

Yin, U.S. Appl. No. 13/628,388, filed Sep. 27, 2012.

Gardner, Jr., U.S. Appl. No. 13/771,779, filed Feb. 20, 2012.

Zheng, U.S. Appl. No. 13/738,908, filed Jan. 10, 2013.

Zheng, et al., U.S. Appl. No. 13/241,034, filed Sep. 22, 2011.

\* cited by examiner

← 206

| LIGHT SOURCE | COMPUTED RATIO | COMPENSATION FACTOR (K) |
|---|---|---|
| LED | <0.5 | 1 |
| CFL | <0.5 | 1 |
| SOLAR | ~0.8 | 3/5 |
| INC | >0.9 | 1/2 |
| ⋮ | | |

| LIGHT SOURCE | COLOR TEMPERATURE (KELVIN) | COMPENSATION FACTOR (K) |
|---|---|---|
| LED | 2700-5000 | 1 |
| CFL | 2700-5000 | 1 |
| SOLAR | 5000-6500 | 5/8 |
| INC | 2700-3300 | 3/8 |
| ⋮ | | |

FIG. 10

| LIGHT SOURCE | MODULATION FREQUENCY (HERTZ) | COMPENSATION FACTOR (K) |
|---|---|---|
| LED | ~120 | 1 |
| CFL | ~120 | 1 |
| SOLAR | ~0 | 1/2 |
| INC | ~0 | 1/2 |
| ⋮ | | |

FIG. 12

AMBIENT LIGHT SENSORS WITH INFRARED COMPENSATION

BACKGROUND

This relates to sensors and, more particularly, to ambient light sensors for electronic devices.

Cellular telephones and other portable devices with displays such a tablet computers sometimes contain ambient light sensors. An ambient light sensor can detect when a portable device is in a bright light environment. For example, an ambient light sensor can detect when a portable device is exposed to direct sunlight. When bright light is detected, the portable device can automatically increase the brightness level of the display to ensure that images on the display remain visible and are not obscured by the presence of the bright light. In dark surroundings, the display brightness level can be reduced to save power and provide a comfortable reading environment.

With conventional devices, ambient light sensors are implemented using first and second silicon photosensors to receive ambient light. The first photosensor is used to detect an amount of infrared light in the ambient light, whereas the second photosensor is used to detect an amount of visible light and infrared light in the ambient light. Readings from the first and second photosensors are subtracted to obtain a corresponding visible light level. This visible light level is then used to increase or decrease the display brightness level accordingly.

Computing visible light levels in this way, however, requires the infrared sensing capabilities of the first and second photosensors to be accurate and consistent relative to one another. Any mismatch in infrared sensitivity can cause the visible light reading to be erroneous. Designing and manufacturing two silicon photosensors that are well-matched in performance may be challenging.

It would therefore be desirable to be able to provide improved ambient light sensor systems for electronic devices.

SUMMARY

An electronic device may have a display with a brightness that is adjusted based on ambient light data from one or more ambient light sensors. The electronic device may be operated in an environment in which the electronic device is exposed to ambient light from at least a given one of a plurality of light sources each producing a different respective ratio of infrared light to visible light. For example, the ambient light may be one of light-emitting-diode (LED) light, fluorescent light, solar light, incandescent light, tungsten light, a mix of some of these lights, and/or other types of light.

The ambient light sensor may be used to characterize the ambient light to determine which of the plurality of light sources produced the ambient light. The electronic device may also include control circuitry for adjusting the display brightness based at least partly on which of the plurality of light sources produced the ambient light. In particular, the electronic device may include at least one silicon-based photosensor that can be used to measure a total ambient light level and to generate a corresponding raw sensor output.

The control circuitry may be used to identify the lighting type of the ambient light (i.e., may determine which of the plurality of light sources produced the ambient light) by computing a ratio of signals generated by at least two silicon-based photosensors on the electronic device, identifying a color temperature of the ambient light, identifying a modulation frequency of the ambient light, using a combination of these techniques, or by obtaining other parameters associated with the ambient light. The control circuitry may then select a suitable compensation factor based on the identified light type by referring to a lookup table stored on the control circuitry. The control circuitry may then output a visible light reading indicative of how much visible light is contained in the ambient light (e.g., by taking the product of the raw sensor reading and the selected compensation factor).

Further features of the present invention, its nature and various advantages will be more apparent from the accompanying drawings and the following detailed description.

BRIEF DESCRIPTION OF THE DRAWINGS

FIG. 8 is a table of illustrative compensation factor values that can be used in computing the compensated sensor output for the ambient light sensor of FIG. 7 in accordance with an embodiment of the present invention.

FIG. 10 is a table of illustrative compensation factor values that can be used in computing the compensated sensor output for the ambient light sensor of FIG. 9 in accordance with an embodiment of the present invention.

FIG. 12 is a table of illustrative compensation factor values that can be used in computing the compensated sensor output for the ambient light sensor of FIG. 11 in accordance with an embodiment of the present invention.

DETAILED DESCRIPTION

Figure 1:
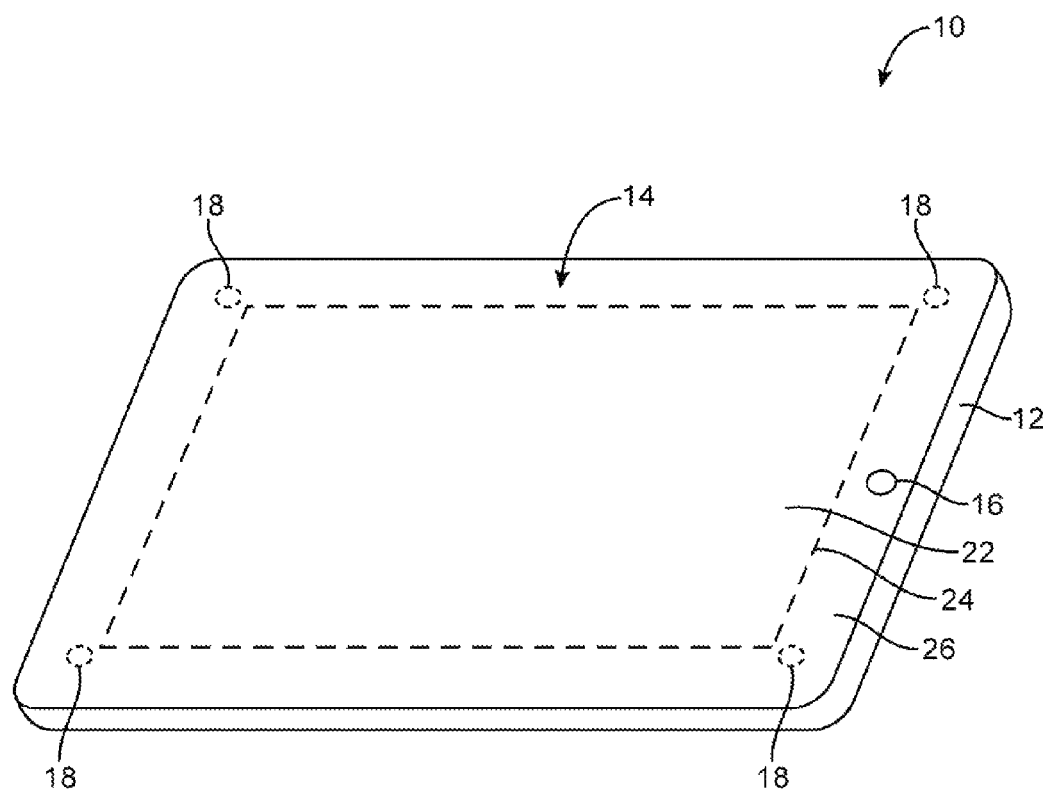
FIG. 1 is a perspective view of an illustrative electronic device with ambient light sensor structures in accordance with an embodiment of the present invention.

Electronic devices such as device 10 of FIG. 1 may be provided with an ambient light sensor system. The ambient light sensor system may use readings from one or more ambient light sensors to determine the brightness level of the ambient environment. Ambient brightness level information may be used by the electronic device in controlling display brightness. For example, in response to determining that ambient light levels are high, an electronic device may increase display brightness to ensure that images on the display remain visible to the user.

Device 10 of FIG. 1 may be a portable computer, a tablet computer, a computer monitor, a handheld device, global positioning system equipment, a gaming device, a cellular telephone, portable computing equipment, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials.

Housing 12 may be formed using an unibody configuration in which some or all of housing 12 is machined or molded as a single structure or may be formed using multiple structures (e.g., an internal frame structure, one or more structures that form exterior housing surfaces, etc.).

In some configurations, housing 12 may be formed using front and rear housing structures that are substantially planar. For example, the rear of device 10 may be formed from a planar housing structure such as a planar glass member, a planar plastic member, a planar metal structure, or other substantially planar structure. The edges (sidewalls) of housing 12 may be straight (vertical) or may be curved (e.g., housing 12 may be provided with sidewalls formed from rounded extensions of a rear planar housing wall).

As shown in FIG. 1, the front of device 10 may include a display such as display 14. The surface of display 14 may be curved or planar. With one suitable arrangement, the surface of display 14 may be covered with a cover layer. The cover layer may be formed from a layer of clear glass, a layer of clear plastic, or other transparent materials (e.g., materials that are transparent to visible light and that are generally transparent to infrared light). The cover layer that covers display 14 may sometimes be referred to as a display cover layer, display cover glass, or plastic display cover layer.

Display 14 may, for example, be a touch screen that incorporates capacitive touch electrodes or a touch sensor formed using other types of touch technology (e.g., resistive touch, light-based touch, acoustic touch, force-sensor-based touch, etc.). Display 14 may include image pixels formed from light-emitting diodes (LEDs), organic LEDs (OLEDs), plasma cells, electronic ink elements, liquid crystal display (LCD) components, or other suitable image pixel structures.

Display 14 may have an active region and an inactive region. Active region 22 of display 14 may lie within rectangular boundary 24. Within active region 22, display pixels such as liquid crystal display pixels or organic light-emitting diode display pixels may display images for a user of device 10. Active display region 22 may be surrounded by an inactive region such as inactive region 26. Inactive region 26 may have the shape of a rectangular ring surrounding active region 22 and rectangular boundary 24 (as an example). To prevent a user from viewing internal device structures under inactive region 26, the underside of the cover layer for display 14 may be coated with an opaque masking layer in inactive region 26. The opaque masking layer may be formed from a layer of ink (e.g., black or white ink or ink of other colors), a layer of plastic, or other suitable opaque masking material.

Device 10 may include input-output ports, buttons, sensors, status indicator lights, speakers, microphones, and other input-output components. As shown in FIG. 1, for example, device 10 may include one or more openings in inactive region 26 of display 14 to accommodate buttons such as button 16. Device 10 may also have openings in other portions of display 14 and/or housing 12 to accommodate input-output ports, speakers, microphones, and other components.

Ambient light sensors may be mounted at any locations within device 10 that are potentially exposed to ambient light. For example, one or more ambient light sensors may be mounted behind openings or other windows in housing 12 (e.g., clear windows or openings in a metal housing, clear windows or openings in a plastic housing, etc.). With one suitable arrangement, one or more ambient light sensors may be formed in device 10 on portions of display 14. For example, one or more ambient light sensors may be mounted to a thin-film transistor layer or other display layer that is located under a display cover layer in inactive region 26 of display 14, as shown by illustrative ambient light sensor locations 18 in FIG. 1.

Ambient light sensors may be mounted under ambient light sensor windows in the opaque masking layer in inactive region 26 or may be mounted in other locations in device 10 that are exposed to ambient light. In configurations in which ambient light sensors are mounted under region 26 of display 14, ambient light sensor windows for the ambient light sensors may be formed by creating circular holes or other openings in the opaque masking layer in region 26. Ambient light sensor windows may also be formed by creating localized regions of material that are less opaque than the remaining opaque masking material or that otherwise are configured to allow sufficiently strong ambient light signals to be detected. For example, ambient light sensor windows may be created by locally thinning portions of an opaque masking layer or by depositing material in the ambient light sensor windows that is partly transparent. During operation, ambient light from the exterior of device 10 may pass through the ambient light sensor windows to reach associated ambient light sensors in the interior of device 10.

The ambient light sensors that are used in device 10 may be formed from silicon or other semiconductors. Ambient light sensors may be mounted on one or more substrates within device 10. With one suitable arrangement, ambient light sensors are formed from a semiconductor such as silicon and are mounted on a substrate layer that is formed from one of the layers in display 14. Other types of ambient light sensors and/or mounting arrangements may be used if desired. The use of silicon ambient light sensors that are mounted on a display substrate layer is merely illustrative.

Figure 2:
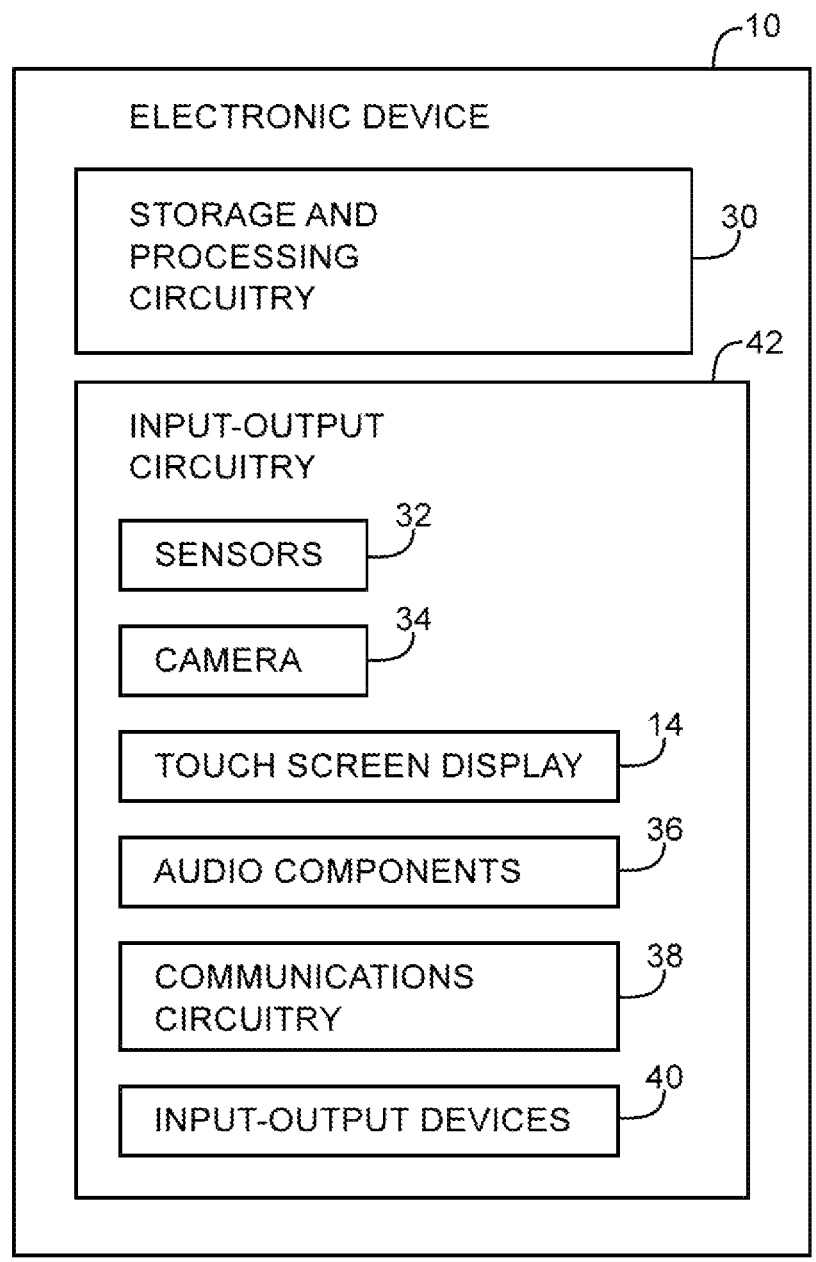
FIG. 2 is a schematic diagram of an illustrative electronic device with ambient light sensor structures in accordance with an embodiment of the present invention.

A schematic diagram of an illustrative electronic device such as electronic device 10 of FIG. 1 is shown in FIG. 2. As shown in FIG. 2, electronic device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processors, power management units, audio codec chips, application specific integrated circuits, display driver integrated circuits, etc.

Storage and processing circuitry 30 may be used to run software on device 10 such as internet browsing applications, voice-over-internet-protocol (VOIP) telephone call applications, email applications, media playback applications, operating system functions, etc. The software may be used to implement control operations such as real time display brightness adjustments or other actions taken in response to measured ambient light data. Circuitry 30 may, for example, be configured to implement a control algorithm that controls the gathering and use of ambient light sensor data from ambient light sensors located in regions such as regions 18 of FIG. 1. Arrangements for device 10 that include a single ambient light sensor may reduce cost and complexity. Arrangements for device 10 that include multiple ambient light sensors may allow control circuitry 30 to discard or otherwise diminish the impact of ambient light sensor data that is gathered from ambient light sensors that are shadowed (and that are therefore producing erroneous or less valuable light readings).

Input-output circuitry 42 may be used to allow data to be supplied to device 10 and to allow data to be provided from device 10 to external devices. Input-output circuitry 42 may include sensors 32 and at least one camera module 34. Sensors 32 may include ambient light sensors, proximity sensors, touch sensors (e.g., capacitive touch sensors that are part of a touch screen display or that are implemented using standalone touch sensor structures), accelerometers, and other sensors. Camera module 34 may include an image sensor, a corresponding lens system, and an associated flash unit that can be used to acquire images for a user during operation of device 10.

Input-output circuitry 42 may also include one or more displays such as display 14. Display 14 may be a liquid crystal display, an organic light-emitting diode display, an electronic ink display, a plasma display, a display that uses other display technologies, or a display that uses any two or more of these display configurations. Display 14 may include an array of touch sensors (i.e., display 14 may be a touch screen). The touch sensors may be capacitive touch sensors formed from an array of transparent touch sensor electrodes such as indium tin oxide (ITO) electrodes or may be touch sensors formed using other touch technologies (e.g., acoustic touch, pressure-sensitive touch, resistive touch, etc.).

Audio components 36 may be used to provide device 10 with audio input and output capabilities. Examples of audio components that may be included in device 10 include speakers, microphones, buzzers, tone generators, and other components for producing and detecting sound.

Communications circuitry 38 may be used to provide device 10 with the ability to communicate with external equipment. Communications circuitry 38 may include analog and digital input-output port circuitry and wireless circuitry based on radio-frequency signals and/or light.

Device 10 may also include a battery, power management circuitry, and other input-output devices 40. Input-output devices 40 may include buttons, joysticks, click wheels, scrolling wheels, touch pads, key pads, keyboards, cameras, light-emitting diodes and other status indicators, etc.

A user can control the operation of device 10 by supplying commands through input-output circuitry 42 and may receive status information and other output from device 10 using the output resources of input-output circuitry 42. Using ambient light sensor readings from one or more ambient light sensors in sensors 32, storage and processing circuitry 30 can automatically take actions in real time such as adjusting the brightness of display 34, adjusting the brightness of status indicator light-emitting diodes in devices 40, adjusting the colors or contrast of display 34 or status indicator lights, etc.

Figure 3:
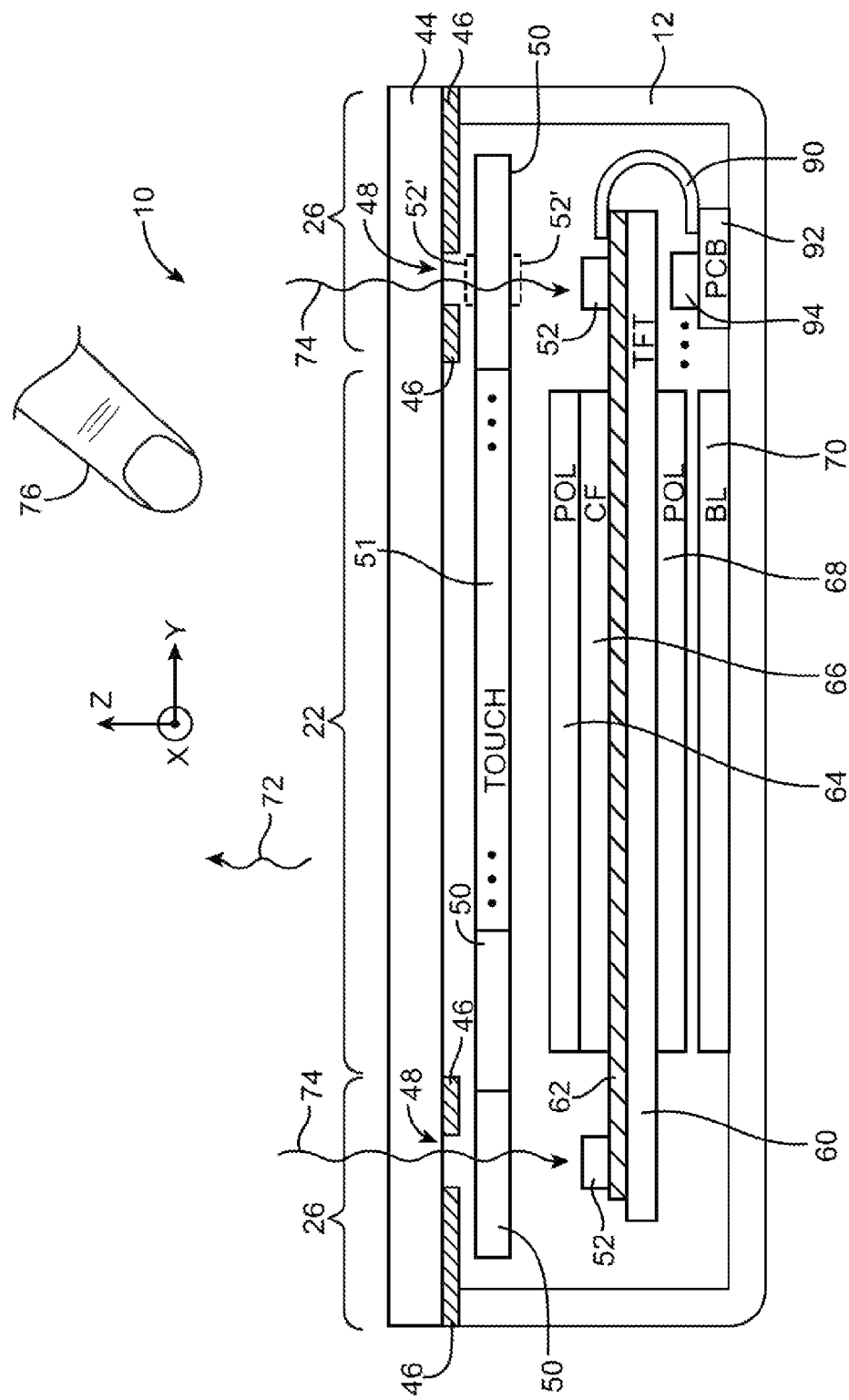
FIG. 3 is a cross-sectional side view of an illustrative electronic device having a display layer such as a thin-film-transistor layer with ambient light sensor structures in accordance with an embodiment of the present invention.

FIG. 3 is a cross-sectional side view of device 10. As shown in FIG. 3, device 10 may include a display such as display 14. Display 14 may have a cover layer such as cover layer 44. Cover layer 44 may be formed from a layer of glass, a layer of plastic, or other transparent material. If desired, the functions of cover layer 44 may be performed by other display layers (e.g., polarizer layers, anti-scratch films, color filter layers, etc.). The arrangement of FIG. 3 is merely illustrative.

Display structures that are used in forming images for display 14 may be mounted under active region 22 of display 14. In the example of FIG. 3, display 14 has been implemented using liquid crystal display structures. If desired, display 14 may be implemented using other display technologies. The use of a liquid crystal display in the FIG. 3 example is merely illustrative.

The display structures of display 14 may include a touch sensor array such as touch sensor array 51 for providing display 14 with the ability to sense input from an external object such as external object 76 when external object 76 is in the vicinity of a touch sensor on array 51. With one suitable arrangement, touch sensor array 51 may be implemented on a clear dielectric substrate such as a layer of glass or plastic and may include an array of indium tin oxide electrodes or other clear electrodes such as electrodes 50. The electrodes may be used in making capacitive touch sensor measurements.

Display 14 may include a backlight unit such as backlight unit 70 for providing backlight 72 that travels vertically upwards in dimension Z through the other layers of display 14. The display structures may also include upper and lower polarizers such as lower polarizer 68 and upper polarizer 64. Color filter layer 66 and thin-film transistor layer 60 may be interposed between polarizers 68 and 64. A layer of liquid crystal material may be placed between color filter layer 66 and thin-film transistor layer 60.

Color filter layer 66 may contain a pattern of colored elements for providing display 14 with the ability to display colored images. Thin-film transistor layer 60 may include pixel structures for applying localized electric fields to the liquid crystal layer. The localized electric fields may be generated using thin-film transistors and associated electrodes that are formed on a clear substrate such as a glass or plastic substrate. The electrodes and other conductive structures on thin-film transistors layer 60 may be formed from metal (e.g., aluminum) and transparent conductive material such as indium tin oxide. In the FIG. 3 example, thin-film transistors (e.g., polysilicon transistors or amorphous silicon transistors) and associated conductive patterns are shown as structures 62.

One or more ambient light sensors 52 may be provided in device 10. As shown in FIG. 3, ambient light sensors 52 may be mounted within device 10 by coupling ambient light sensors 52 to traces in structures 62 on thin-film transistor layer 60. If desired, ambient light sensors 52 may be mounted on other layers of display 14. For example, dashed lines 52' show how ambient light sensors may be mounted to a display layer such as touch sensor layer 51. Ambient light sensors in device 10 may also be mounted to cover layer 44, a polarizer layer, a color filter layer, a backlight structure layer, or any other suitable display layer. Ambient light sensors in device 10 may also be mounted on printed circuit board substrates (e.g. flexible printed circuits and/or rigid printed circuit boards), if desired. Illustrative configurations in which ambient light sensors 52 are mounted on thin-film transistor layer 60 are sometimes described herein as an example.

Indium tin oxide traces or other conductive patterned traces that are formed on thin-film transistor layer 60 may form electrical paths that are connected to leads in ambient light sensors 52. For example, one or more contacts such as gold pads or pads formed from other metals may be attached to indium tin oxide traces or metal traces using anisotropic conductive film (ACF) or other conductive adhesive. Solder connections, welds, connections formed using connectors, and other electrical interconnect techniques may be used to mount ambient light sensors 52 to thin-film transistor layer 60 if desired.

An opaque masking layer such as opaque masking layer 46 may be provided in inactive region 26. The opaque masking layer may be used to block internal device components from view by a user through peripheral edge portions of clear display cover layer 44. The opaque masking layer may be formed from black ink, black plastic, plastic or ink of other colors, metal, or other opaque substances. Ambient light sensor windows such as windows 48 may be formed in opaque masking layer 46. For example, circular holes or openings with other shapes may be formed in layer 46 to serve as ambient light sensor windows 48. Ambient light sensor windows 48 may, if desired, be formed in locations such as locations 18 of FIG. 1.

If desired, a flexible printed circuit ("flex circuit") cable such as cable 90 may be used to interconnect traces 62 on thin-film transistor layer 60 to additional circuitry in device 10 (e.g., storage and processing circuitry 30 of FIG. 2). Flex circuit cable 90 may, for example, be used to interconnect ambient light sensors 52, a driver integrated circuit on thin-film transistor layer 60, and thin-film transistor circuitry on thin-film transistor layer 60 to circuitry on a substrate such as printed circuit 92. The circuitry on substrate 92 may include integrated circuits and other components 94 (e.g., storage and processing circuitry 30 of FIG. 2).

During operation of device 10, ambient light 74 may pass through ambient light sensor windows 48 and may be detected using ambient light sensors 52. Signals from ambient light sensors 52 may be routed to analog-to-digital converter circuitry that is implemented within the silicon substrates from which ambient light sensors 52 are formed, to analog-to-digital converter circuitry that is formed on thin-film-transistor layer 60 or that is formed in an integrated circuit that is mounted to thin-film transistor layer 60, or to analog-to-digital converter circuitry and/or other control circuitry located elsewhere in device 10 such as one or more integrated circuits in storage and processing circuitry 30 of FIG. 2 (e.g., integrated circuits containing analog-to-digital converter circuitry for digitizing analog ambient light sensor signals from sensors 52 such as integrated circuits 94 on substrate 92).

If desired, an ambient light sensor may be implemented as part of a silicon device that has additional circuitry (i.e., ambient light sensors 52 may be implemented as integrated circuits). An ambient light sensor with this type of configuration may be provided with built-in analog-to-digital converter circuitry and communications circuitry so that digital light sensor signals can be routed to a processor using a serial interface or other digital communications path.

Figure 4:
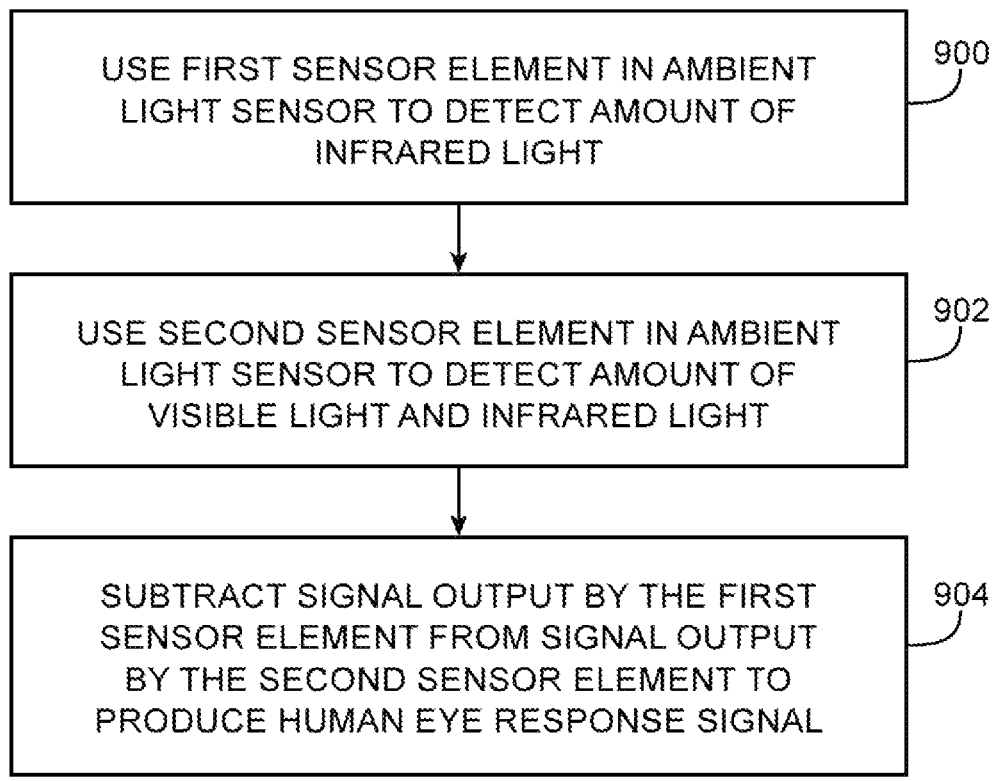
FIG. 4 is a flow chart of conventional steps for detecting ambient light levels.

FIG. 4 is a flow chart of steps for detecting ambient light levels using a conventional ambient light sensor system. A conventional ambient light sensor includes first and second sensor elements formed on a silicon substrate. At step 900, the first sensor element is used to detect an amount of infrared (IR) light emit from the ambient environment and to generate a corresponding first output signal. At step 902, the second sensor element is used to detect an amount of visible light and infrared light emit from the ambient environment and to generate a corresponding second output signal. Steps 900 and 902 are performed in parallel.

At step 904, the first output signal is subtracted from the second output signal to obtain a human eye response signal (i.e., a signal substantially proportional to the amount of visible light in the ambient environment). Computing the amount of ambient visible light using this conventional approach, however, requires the infrared sensing capabilities of the first and second sensor elements to be accurate and consistent relative to one another. Any mismatch in infrared sensitivity can cause the visible light reading to be faulty. Because designing and manufacturing two sensors that are well-matched in performance is challenging, it would be desirable to provide improved ways of computing visible light level information.

Figure 5:
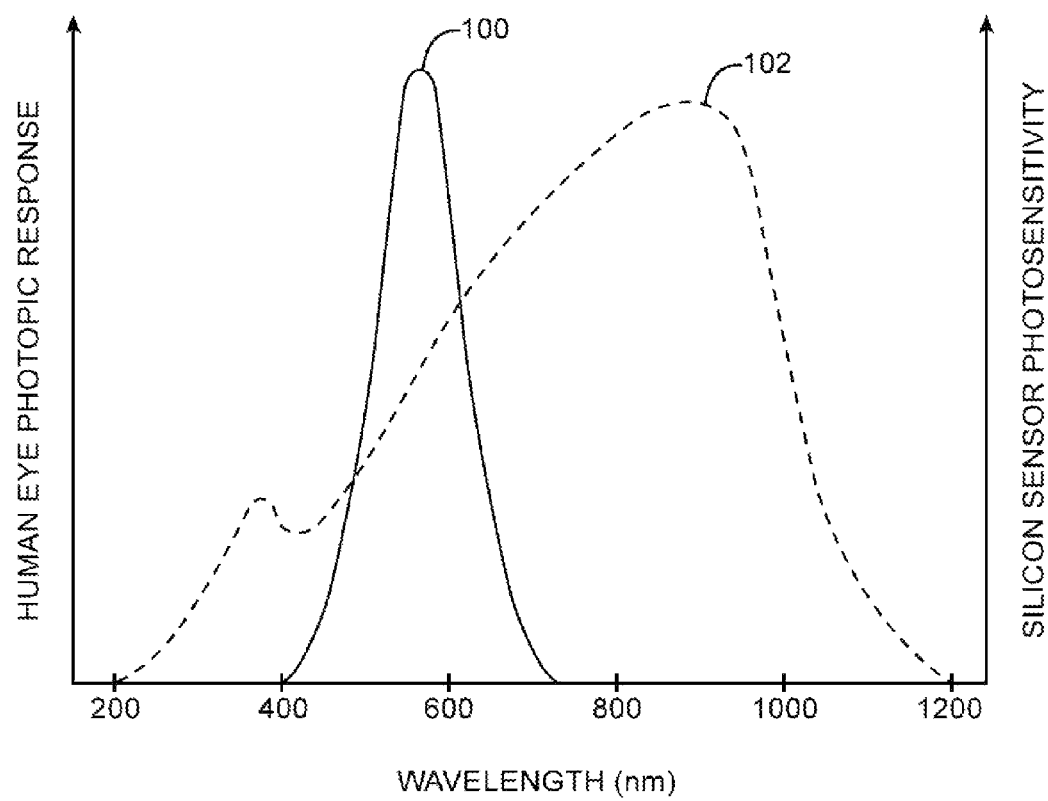
FIG. 5 is a plot showing a mismatch between the human eye photopic response and silicon sensor photosensitivity in accordance with an embodiment of the present invention.

FIG. 5 is a plot comparing the human eye photopic response to the sensitivity of a silicon photosensor (e.g., a photosensitive element fabricated on a silicon substrate). Characteristic curve 100 may represent the human eye photopic response, whereas characteristic curve 102 may represent the silicon photosensor sensitivity. As shown in FIG. 5, the human eye can detect light in the visible spectrum (e.g., the human eye can detect light having wavelengths ranging from approximately 390 nanometers to 750 nanometers) while a silicon-based photosensor is sensitive to light in the visible spectrum and light outside of the visible spectrum (e.g., the silicon photosensor can be used to detect light having wavelengths ranging from approximately 200 nanometers to 1200 nanometers).

A silicon photosensor may, as an example, be more sensitive to light outside the visible spectrum. As shown in the plot of FIG. 5, the silicon photosensor may exhibit lower sensitivity to light in the visible spectrum and relatively higher sensitivity to light in the infrared (IR) spectrum (e.g., the silicon photosensor may exhibit elevated sensitivity to light having wavelengths ranging from 800 nanometers to 1000 nanometers). In other words, a silicon photosensor will not only pick up light in the visible spectrum but also light in the IR spectrum. Because humans can only detect light in the visible spectrum, it may be desirable for ambient light sensors implemented using silicon-based sensors to output signals reflective of only the amount of light in the visible spectrum without taking into account the IR content of the light emit from the ambient environment.

Figure 6:
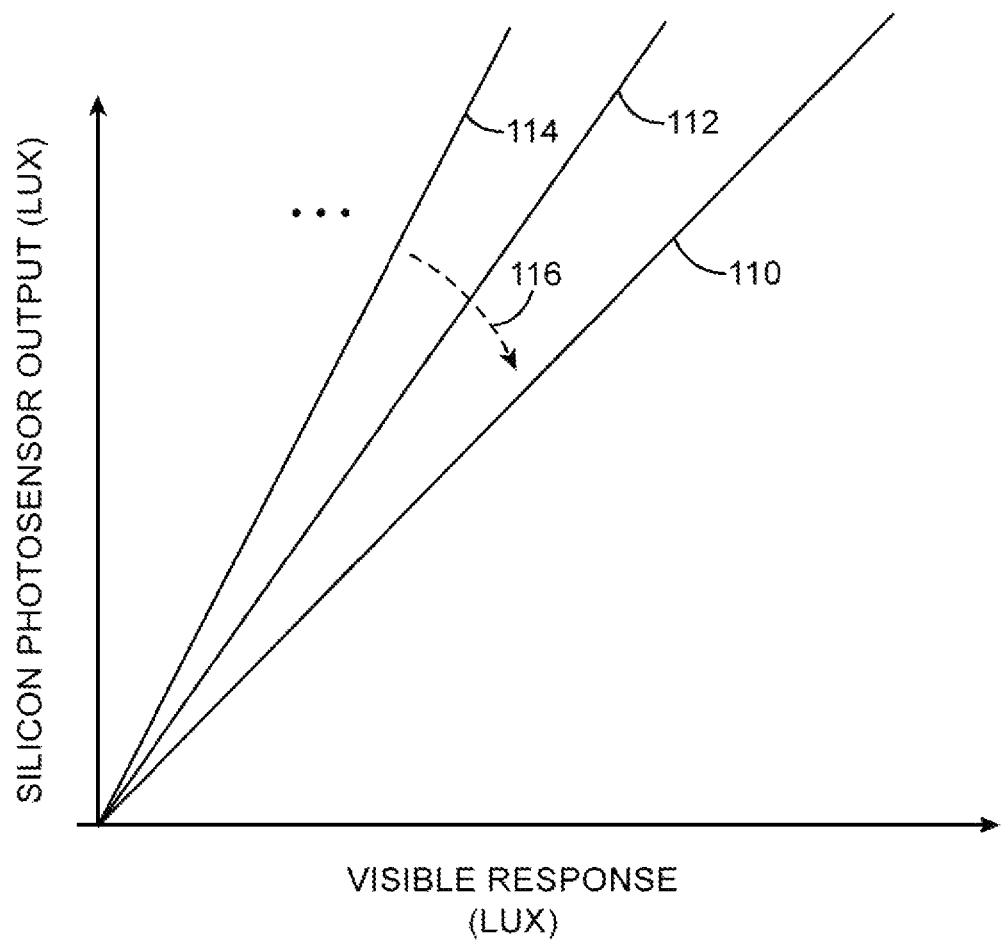
FIG. 6 is a plot showing how a silicon photosensor may respond to various light sources in accordance with an embodiment of the present invention.

FIG. 6 is a plot showing how a silicon photosensor responds to different types of light sources. In the example of FIG. 6, line 110 may represent the response of a first light source of a first type, line 112 may represent the response of a second light source of a second type, and line 114 may represent the response of a third light source of a third type. For example, the first light source may be an LED or fluorescent light source. As another example, the second light source may be a solar light source. As another example, the third light source may be an incandescent light source.

The x-axis of FIG. 6 plots the actual visible light level as perceived by the human eye (e.g., as measured using a lux meter in units of lux). The y-axis of FIG. 6 plots the raw silicon sensor output level as produced using a silicon photosensor (in units of lux). Line 110 may, for example, have a slope of one. Light sources having a slope of one exhibit low or negligible IR levels. Line 112 may have a slope that is greater than one. Line 114 may have a slope that is even greater than that of line 112. The difference in slope may be attributed to light sources with varying IR levels as captured using the silicon photosensor (e.g., silicon photodetectors are capable of sensing infrared light levels in addition to visible light levels, as described in connection with FIG. 5). Lines with greater slopes may contain higher levels of IR transmission. Other types of light sources may produce yet other responses with slopes that are at least equal to one.

In general, it is desirable for ambient light sensors to detect light in the visible spectrum since humans are only capable of perceiving light in that particular range. In other words, it may be advantageous for ambient light sensors to detect ambient light levels based only on the amount of visible light present but not on the amount of IR light or other types of existing light source with wavelengths outside the visible spectrum (e.g., it may be desirable to remove the IR content from the raw silicon photosensor output so that a corresponding final sensor output is representative of only the visible light that is present in the ambient environment).

This can be accomplished by compensating the silicon photosensor output values (e.g., by adjusting/normalizing the responses with non-negligible IR content to match the response of line 110 having negligible IR content). For example, sensor output values associated with line 112 may be adjusted using a first compensation factor, whereas sensor output values associated with line 114 may be adjusted using a second compensation factor that is different than the first compensation factor so as to effectively shift lines 112 and 114 towards line 110 (as indicated by arrow 116 in FIG. 6).

Figure 7:
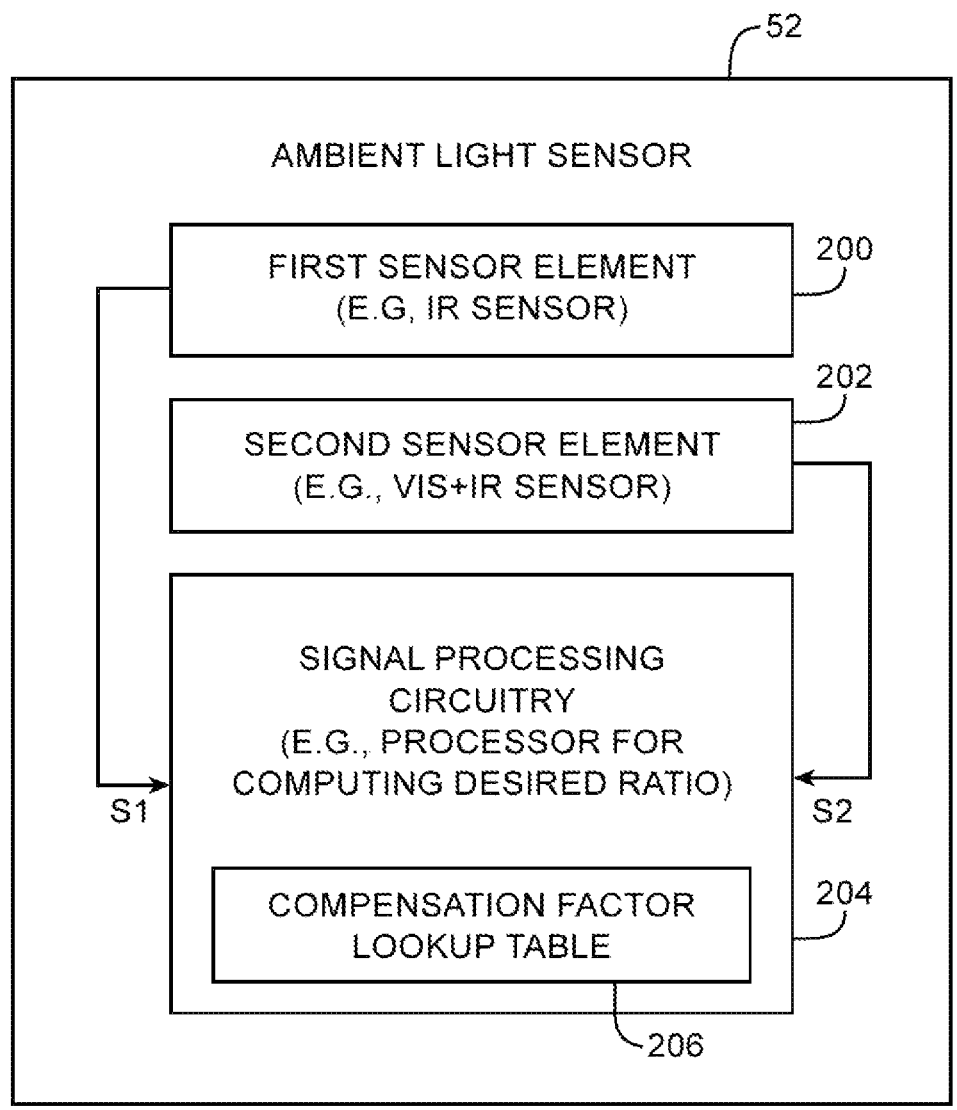
FIG. 7 is a diagram of an illustrative ambient light sensor configured to produce a compensated sensor output based on a computed ratio in accordance with an embodiment of the present invention.

FIG. 7 shows one suitable arrangement of ambient light sensor 52. As shown in FIG. 7, ambient light sensor 52 may include a first sensor element 200, a second sensor element 202, and associated ambient light sensor signal processing circuitry 204 for identifying a lighting type associated with the ambient light. First and second sensor elements 200 and 202 may be silicon-based photosensors (e.g., photosensitive elements formed on a silicon substrate) that are described in connection with FIGS. 5 and 6. First silicon photosensor 200 may serve as a sensor for detecting IR light levels, whereas second silicon photosensor 202 may serve as a sensor for detecting visible and IR light levels. Optical filter structures such as a green filter and a red filter formed on top of the green filter may be placed over first photosensor 200 to prevent light in the visible spectrum from passing through to the silicon (as an example). If desired, other types of IR sensors that are insensitive to visible light can be used.

In response to receiving ambient light, first photosensor 200 may generate a corresponding signal S1 while second photosensor 202 may generate a corresponding signal S2. Signal S1 may be proportional to the amount of infrared light that is present in the ambient environment, whereas signal S2 may be proportional to the amount of visible and infrared (VIS+IR) light that is present in the ambient environment. Signals S1 and S2 generated in this way may be routed to signal processing circuitry 204 for data conversion, processing, and/or storage. In general, signal processing circuitry 204 may be implemented on the silicon substrate from which the first and second photosensors are formed, on thin-film-transistor layer 60, on an integrated circuit that is mounted to thin-film transistor layer 60, or as part of control circuitry located elsewhere in device 10 such as one or more integrated circuits in storage and processing circuitry 30 of FIG. 2.

Signal processing circuitry 204 of FIG. 7 may be used to compute a ratio of first sensor output level S1 to second sensor output level S2 (e.g., a ratio that is equal to S1 divided by S2). This ratio may be reflective of the amount of IR light in the ambient environment. For example, if the IR levels are high, the computed ratio may be closer to one. If the IR levels are low, the computed ratio may be closer to zero.

Signal processing circuitry 204 may then refer to a compensation factor lookup table 206 that is stored on circuitry 204 (as an example). Different ratio levels may correspond to a respective entry in lookup table 206 listing a desired sensor output compensation factor that should be used when calculating the final sensor output value (see, e.g., FIG. 8). As shown in table 206 of FIG. 8, if the computed ratio is less than 0.5 (which is indicative of an LED or compact fluorescent light source), a compensation factor (K) of 1.0 should be selected. If the computed ratio is approximately equal to 0.8 (which is indicative of a solar light source), a K factor of 3/5 should be used. If the computed ratio is greater than 0.9 (which is indicative of an incandescent light source), a K factor of 1/2 should be used. The values and ranges as shown in FIG. 8 are merely illustrative and do not serve to limit the scope of the present invention. If desired, lookup table 206 may include ratio ranges and associated compensation factor values corresponding to more or less than four different light types.

A final compensated sensor output value may be computed using equation 1 as follows:

$$Sout = K * Sraw \qquad (1)$$

As shown in equation 1, final compensated sensor output signal Sout may be calculating by taking the product of compensation factor K and a raw (uncompensated) sensor output value Sraw. Raw sensor output value Sraw may include visible light and infrared light content (e.g., Sraw may represent the total ambient light level). In the example of FIG. 7, Sraw may be set equal to signal S2 that is generated using second photosensor 202. Signal Sout that is computed in this way may be only representative of the ambient brightness level according to the human response and may be used in controlling the brightness level of display 14 during normal operation of device 10 (e.g., Sout is a visible light reading indicative of how much visible light is contained in the ambient light).

Figure 9:
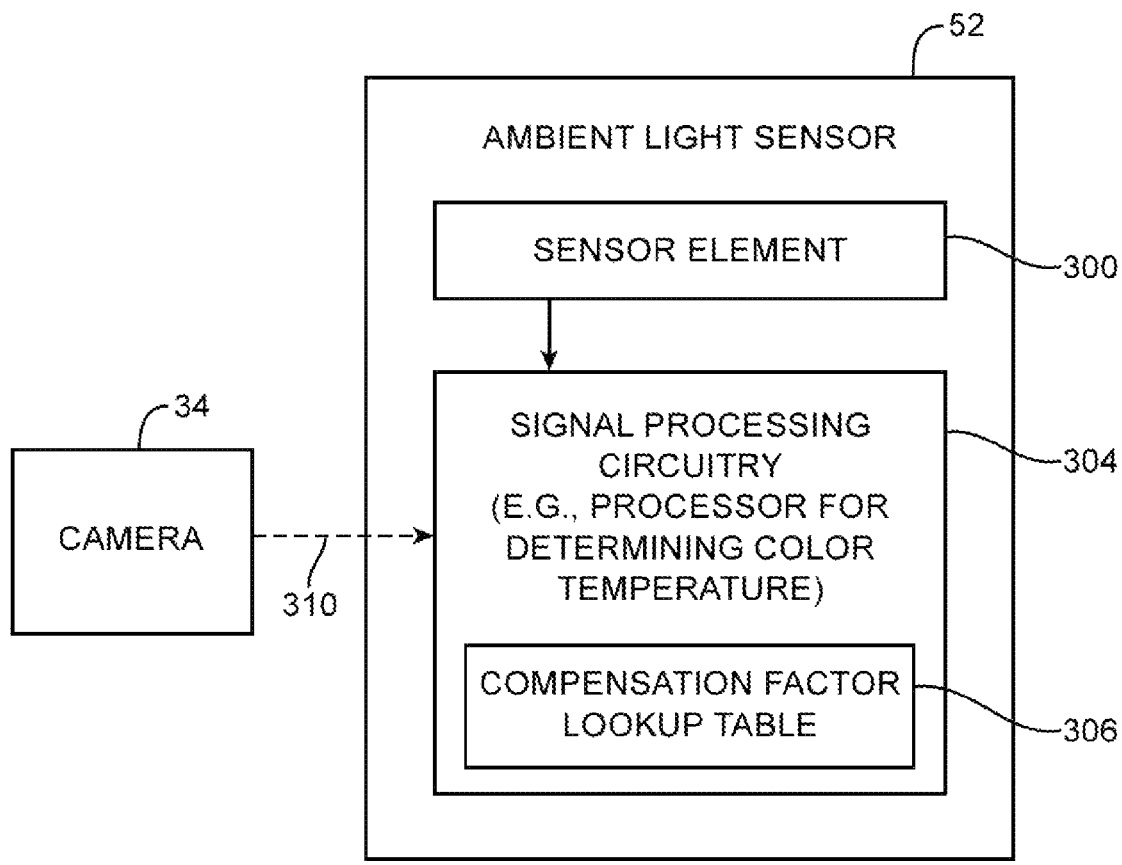
FIG. 9 is a diagram of an illustrative ambient light sensor configured to produce a compensated sensor output based on a color temperature value in accordance with an embodiment of the present invention.

FIG. 9 shows another suitable arrangement of ambient light sensor 52. As shown in FIG. 9, ambient light sensor 52 may include a sensor element 300 (e.g., a silicon photosensor) and associated ambient light sensor signal processing circuitry 304 for identifying a lighting type associated with the ambient light. Photosensor 300 may provide a signal that is proportional to the amount of light present in the ambient environment to circuitry 304. Circuitry 304 may, for example, be capable of performing multiple spectral point measurements to determine the color temperature of the ambient light source. If desired, an assistance device such as camera module 34 may include processing circuitry for determining the color temperature of the ambient light source and may provide this information to circuitry 304 via signal path 310. Ambient light sensor 52 may rely on at least one color temperature sensing mechanism to determine the type of light source that is present, whether using sensor element 300, camera 34, and/or other ways of obtaining color temperature information.

As with other embodiments described herein, signal processing circuitry 304 may be implemented on the silicon substrate from which photosensor 300 is formed, on thin-film-transistor layer 60, on an integrated circuit that is mounted to thin-film transistor layer 60, or as part of control circuitry located elsewhere in device 10 such as one or more integrated circuits in storage and processing circuitry 30 of FIG. 2.

Signal processing circuitry 304 of FIG. 9 may be used to obtain and/or determine the color temperature of the existing ambient light. Color temperature information may be indicative of the type of light source that is present. Signal processing circuitry 304 may then refer to a compensation factor lookup table 306 that is stored on circuitry 304. Different color temperature levels may correspond to a respective entry in lookup table 306 listing a desired sensor output compensation factor that should be used when calculating the compensated sensor output value (see, e.g., FIG. 10).

As shown in table 306 of FIG. 10, if the color temperature falls within 2700 and 5000 Kelvin (which may be indicative of an LED or compact fluorescent light source), a compensation factor (K) of 1.0 should be selected. If the color temperature falls within 5000 and 6500 Kelvin (which is indicative of a solar light source), a K factor of 5/8 should be used. If the color temperature falls within 2700 and 3000 Kelvin (which may be indicative of an incandescent light source), a K factor of 3/8 should be used. Different types of light sources having different IR content may have overlapping color temperature ranges. As a result, this technique may be used in conjunction with other light differentiation techniques in order to further narrow down the type of existing light source. The values and ranges as shown in FIG. 10 are merely illustrative and do not serve to limit the scope of the present invention. If desired, lookup table 306 may include color temperature ranges and associated compensation factor values corresponding to more or less than four different types of light sources.

The final compensated sensor output value may also be computed using equation 1. In the example of FIG. 9, Sraw may be set equal to the signal that is generated using photosensor 300. Signal Sout that is computed in this way may be representative of the ambient brightness level according to the human response and may be used in controlling the brightness level of display 14 during normal operation of device 10.

Figure 11:
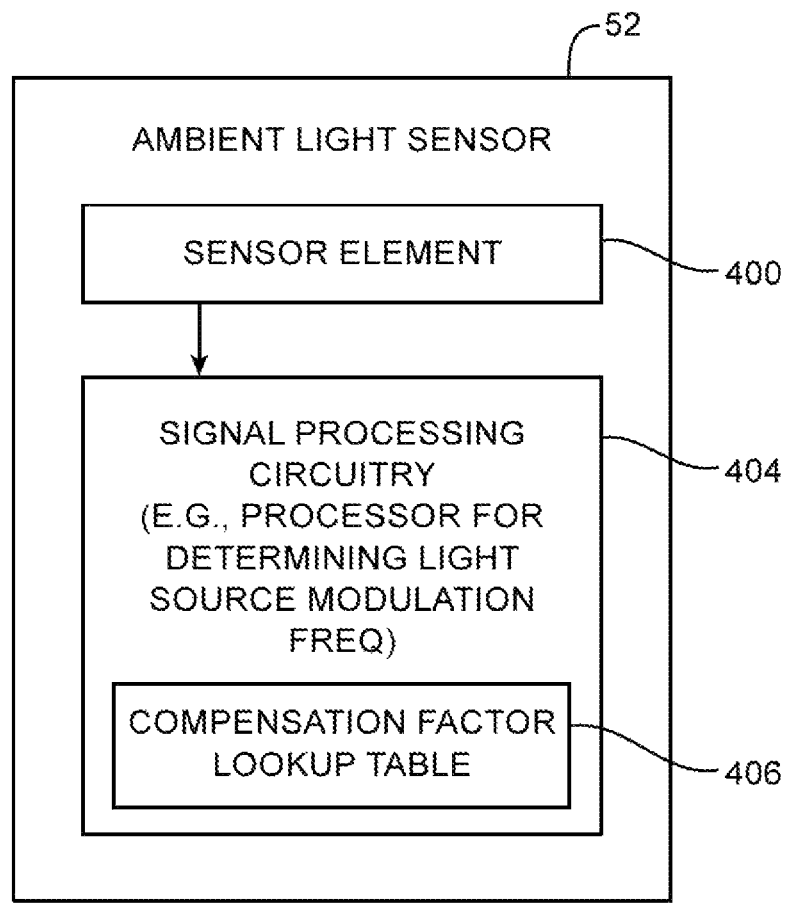
FIG. 11 is a diagram of an illustrative ambient light sensor configured to produce a compensated sensor output based on a light modulation frequency in accordance with an embodiment of the present invention.

FIG. 11 shows another suitable arrangement of ambient light sensor 52. As shown in FIG. 11, ambient light sensor 52 may include a sensor element 400 (e.g., a silicon photosensor) and associated ambient light sensor signal processing circuitry 404 for identifying a lighting type associated with the ambient light. Photosensor 400 may provide a signal that is proportional to the amount of light present in the ambient environment to circuitry 404. Circuitry 404 may, for example, be capable of measuring a modulation frequency of the light source (e.g., to measure the level of "flicker" in the ambient light source).

As with other embodiments described herein, signal processing circuitry 404 may be implemented on the silicon substrate from which photosensor 400 is formed, on thin-film-transistor layer 60, on an integrated circuit that is mounted to thin-film transistor layer 60, or as part of control circuitry located elsewhere in device 10 such as one or more integrated circuits in storage and processing circuitry 30 of FIG. 2.

Signal processing circuitry 404 of FIG. 11 may be used to determine the modulation frequency of the existing ambient light. Light source modulation frequency information may be indicative of the type of light source that is present. Signal processing circuitry 404 may then refer to a compensation factor lookup table 406 that is stored on circuitry 404. Different light modulation frequency levels may correspond to a respective entry in lookup table 406 listing a desired sensor output compensation factor that should be used when calculating the final sensor output value (see, e.g., FIG. 12).

As shown in table 406 of FIG. 12, if the modulation frequency is approximately equal to 120 Hz (which is indicative of an LED or compact fluorescent light source), a compensation factor K of 1.0 should be selected. If the modulation frequency is approximately equal to 0 Hz (which is indicative of a solar light source or an incandescent light source), a K factor of 1/2 should be selected. The values and ranges as shown in FIG. 12 are merely illustrative and do not serve to limit the scope of the present invention. If desired, lookup table 406 may include modulation frequency ranges and associated compensation factor values corresponding to more or less than four different types of light sources.

The final compensated sensor output value may also be computed using equation 1. In the example of FIG. 11, Sraw may be set equal to the signal that is generated using photosensor 400. Signal Sout that is computed in this way may be representative of the ambient brightness level according to the human response and may be used in controlling the brightness level of display 14 during normal operation of device 10.

Methods of compensating raw sensor output values as described in connection with FIGS. 7-12 may be used in any desired combination. For example, ambient light sensor circuitry may first compute the light source modulation frequency to distinguish between LED/fluorescent sources and solar/incandescent sources during a first detection phase (see, FIG. 12). During a second detection phase, the ambient light sensor circuitry may then obtain the color temperature to distinguish between solar and incandescent sources because solar and incandescent light have different color temperatures (see, FIG. 10).

If desired, other combination of techniques may be employed to determine whether the predominant light source in the ambient environment is an LED light source, a fluorescent light source, a solar light source, an incandescent light source, a tungsten light source, or other types of light source. In other suitable embodiments, ambient light sensor 52 may be operated in an environment with mixed lighting. In such scenarios, processing circuitries 204, 304, and 404 (sometimes referred to as control circuitries) may identify the lighting type based on the dominant light source that is present in the ambient environment.

Figure 13:
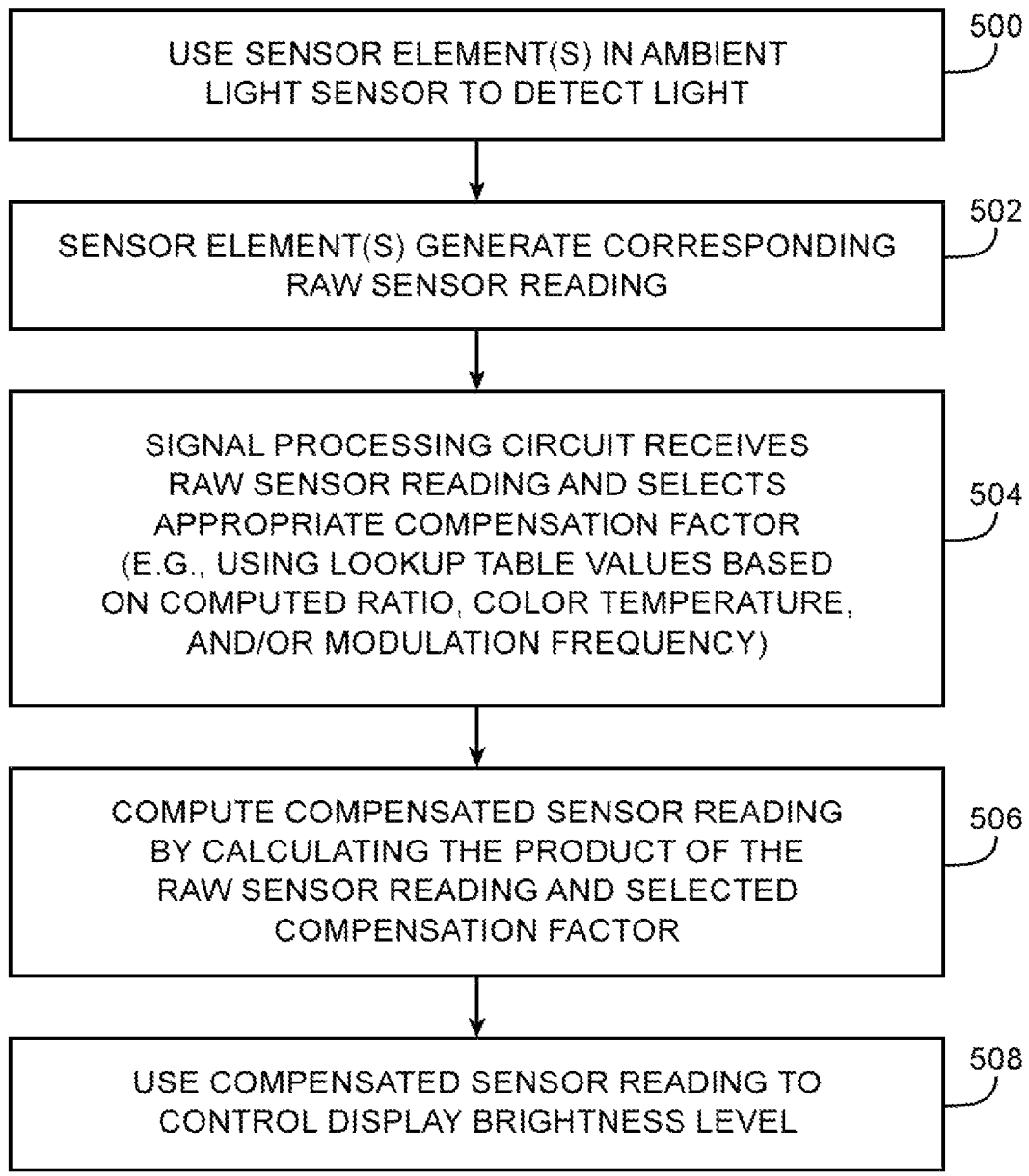
FIG. 13 is a flow chart of illustrative steps involved in operating an ambient light sensor to output a compensated sensor output in accordance with an embodiment of the present invention.

FIG. 13 is a flow chart of illustrative steps involved in using an ambient light sensor 52 to output a compensated sensor output. At step 500, at least one photosensitive element in ambient light sensor 52 may be used to detect the amount of ambient light surrounding device 10. At step 502, the at least one photosensitive element may generate a corresponding raw sensing reading Sraw.

At step 504, a signal processor (e.g., control circuitry 204, 304, and/or 404) may receive the raw sensor reading and select an appropriate compensation factor K by referring to a lookup table based on a computed ratio (as described in connection with FIGS. 7 and 8), the color temperature of the light source (as described in connection with FIGS. 9 and 10), the modulation frequency of the light source (as described in connection with FIGS. 11 and 12), and/or other parameters associated with the existing ambient light source. The different methods as described in connection with FIGS. 7-12 may be used in combination with one another to determine the type of light source that is present so that the desired compensation factor K may be selected.

At step 506, a compensated sensor reading Sout may be obtained by computing the product of Sraw and the selected compensation factor (see, equation 1). The compensated sensor reading Sout, which is representative of the ambient brightness level according to the human response (without any infrared content), may then be used in controlling the brightness level of display 14 during normal operation of device 10 (step 508).

The foregoing is merely illustrative of the principles of this invention and various modifications can be made by those skilled in the art without departing from the scope and spirit of the invention. The foregoing embodiments may be implemented individually or in any combination.

What is claimed is:

1. A method of adjusting display brightness for a display in an electronic device that has an ambient light sensor and control circuitry while the electronic device is operated in an environment in which the electronic device is exposed to ambient light, the method comprising:

with a first silicon photosensor in the ambient light sensor, outputting a first sensor reading indicative of how much visible light and infrared light are contained in the ambient light;

with a second silicon photosensor in the ambient light sensor, outputting a second sensor reading indicative of how much infrared light is contained in the ambient light;

processing ambient light data from the ambient light sensor to identify a lighting type associated with the ambient light; and with the control circuitry, processing the sensor reading using the identified lighting type to produce a visible light reading indicative of how much visible light is contained in the ambient light, wherein the visible light reading is produced by applying a compensation factor to only the first sensor reading, and wherein the compensation factor is selected using the first sensor reading and the second sensor reading.

2. The method defined in claim 1, wherein processing the ambient light data from the ambient light sensor comprises computing a ratio based on the first sensor reading and the second sensor reading.

3. The method defined in claim 2, wherein the compensation factor is selected using the ratio.

4. The method defined in claim 1, wherein identifying the lighting type associated with the ambient light further comprises identifying a modulation frequency of the ambient light.

5. The method defined in claim 1, wherein the visible light reading is a product of the sensor reading and the compensation factor.

6. An electronic device, comprising:
a display having an adjustable brightness level;
an ambient light sensor configured to receive ambient light, wherein the ambient light sensor comprises:
 a first photosensor that generates a first sensor output that represents an amount of visible light and infrared light in the ambient light;
 a second photosensor that generates a second sensor output that represents an amount of infrared light in the ambient light; and
control circuitry configured to compute a compensated sensor output based on the first sensor output and a selected compensation factor by applying the selected compensation factor directly to the first sensor output, wherein the selected compensation factor is selected based on the first sensor output and the second sensor output, and wherein the compensated sensor output is used to control the brightness level of the display.

7. The electronic device defined in claim 6, wherein the control circuitry is further configured to identify a lighting type associated with the ambient light.

8. The electronic device defined in claim 6, wherein the control circuitry is further configured to identify a modulation frequency associated with the ambient light.

9. The electronic device defined in claim 6, wherein control circuitry is further configured to store a lookup table from which the selected compensation factor is selected.

10. The electronic device defined in claim 6, wherein the control circuitry is further configured to compute the compensated sensor output by calculating a product of the first sensor output and the selected compensation factor.

11. The electronic device defined in claim 6, wherein the control circuitry is further configured to compute a ratio based on the first sensor output and the second sensor output, and wherein the selected compensation factor is selected based on the ratio.

12. A method of adjusting display brightness for a display in an electronic device that has an ambient light sensor and control circuitry while the electronic device is operated in an environment in which the electronic device is exposed to ambient light from at least a given one of a plurality of light sources each producing a different respective ratio of infrared light to visible light, wherein the ambient light sensor includes a first and second silicon photosensors, the method comprising:

using the control circuitry to receive a raw sensor output from the ambient light sensor, wherein the raw sensor output includes a first sensor output generated from the first silicon photosensor and a second sensor output generated from the second silicon photosensor;

characterizing the ambient light to determine which of the plurality of light sources produced the ambient light;

computing a compensated sensor output based on the raw sensor output without performing a subtraction operation based on the first and second sensor outputs; and with the control circuitry, adjusting the display brightness based on the compensated sensor output.

13. The method defined in claim 12, wherein the plurality of light sources comprises a dominant ambient light source, and wherein characterizing the ambient light comprises identifying the ratio of infrared light to visible light for the given light source.

14. The method defined in claim 12, wherein the plurality of light sources comprises a dominant ambient light source, and wherein characterizing the ambient light comprises identifying a color temperature of the dominant ambient light source.

15. The method defined in claim 12, wherein the plurality of light sources comprises a dominant ambient light source, and wherein characterizing the ambient light comprises identifying a modulation frequency of the dominant ambient light source.

16. The method defined in claim 12, wherein characterizing the ambient light with the ambient light sensor comprises determining whether the given light source has a lighting type selected from the group consisting of: light-emitting-diode light, fluorescent light, solar light, incandescent light, and tungsten light.

* * * * *